United States Patent
Hoffmockel et al.

(10) Patent No.: US 8,202,964 B2
(45) Date of Patent: Jun. 19, 2012

(54) INITIATOR

(75) Inventors: Michael Hoffmockel, Niedernhausen (DE); Michael Haubs, Bad Kreuznach (DE); Horst Röschert, Ober-Hilbersheim (DE)

(73) Assignee: Ticona GmbH, Sulzbach (Taunus) (DE)

( * ) Notice: Subject to any disclaimer, the term of this patent is extended or adjusted under 35 U.S.C. 154(b) by 0 days.

(21) Appl. No.: 13/043,080

(22) Filed: Mar. 8, 2011

(65) Prior Publication Data

US 2011/0160428 A1    Jun. 30, 2011

Related U.S. Application Data

(62) Division of application No. 11/861,832, filed on Sep. 26, 2007, now Pat. No. 7,902,324.

(60) Provisional application No. 60/847,268, filed on Sep. 26, 2006.

(51) Int. Cl.
*C08F 6/00* (2006.01)
*C08G 2/28* (2006.01)
*C09K 3/00* (2006.01)

(52) U.S. Cl. ........ 528/482; 528/486; 528/488; 528/232; 528/502 C; 528/503; 252/182.13; 252/182.32; 252/182.17; 252/182.15; 252/182.23

(58) Field of Classification Search ............. 252/182.13, 252/182.32, 182.17, 182.15, 182.23; 528/482, 528/486, 488, 232, 502 C, 503
See application file for complete search history.

(56) References Cited

U.S. PATENT DOCUMENTS

| | | | |
|---|---|---|---|
| 3,848,020 | A | 11/1974 | Berg et al |
| 3,883,450 | A | 5/1975 | Berg et al. |
| 5,962,623 | A | 10/1999 | Eckardt et al. |
| 7,812,110 | B2 | 10/2010 | Haubs et al. |
| 7,902,324 | B2 | 3/2011 | Hoffmockel et al. |
| 2007/0179273 | A1 | 8/2007 | Haubs et al. |
| 2008/0125566 | A1 | 5/2008 | Hoffmockel et al. |
| 2009/0264615 | A1 | 10/2009 | Haubs et al. |
| 2009/0270572 | A1 | 10/2009 | Haubs et al. |
| 2009/0270587 | A1 | 10/2009 | Haubs et al. |
| 2011/0160428 | A1 | 6/2011 | Hoffmockel et al. |

FOREIGN PATENT DOCUMENTS

| | | |
|---|---|---|
| DE | 2 141 600 | 3/1973 |
| EP | 0 678 535 A1 | 10/1990 |
| JP | 09302055 | 11/1997 |
| JP | 10292039 | 11/1998 |

OTHER PUBLICATIONS

Sanda, et al., New Transformation of 1,3-Oxathiolane-2-thione into 1,3-Dithiolan-2-one via Polymerization and Depolymerization, *Macromol. Rapid Commun.*, (2001), 22; pp. 363-366.

*Primary Examiner* — Duc Truong
(74) *Attorney, Agent, or Firm* — Dority & Manning, P.A.

(57) ABSTRACT

An initiator for cationic polymerization comprises a salt of a protic acid as well as a protic acid. The molar ratio of protic acid to salt is in the range from 1:0.01 to 1:2000. The initiator is used for example for cationic homo- or copolymerization of trioxane, and permits stable and flexible operation of the polymerization.

11 Claims, 1 Drawing Sheet

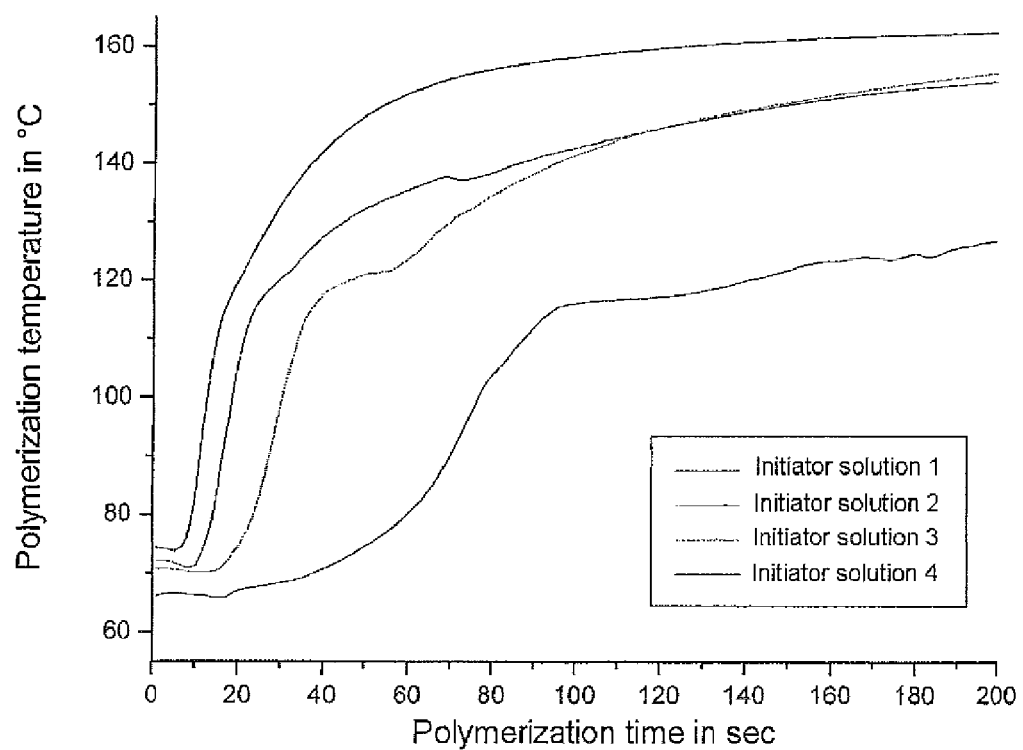

INITIATOR

RELATED APPLICATIONS

The present application is a divisional application of U.S. patent application Ser. No. 11/861,832 filed on Sep. 26, 2007, now U.S. Pat. No. 7,902,324, which is based upon and claims priority to U.S. Provisional Application No. 60/847,268, filed on Sep. 26, 2006.

1. FIELD OF INVENTION

The present invention concerns an initiator for cationic polymerization. This invention also concerns a process for cationic polymerization of monomers in the presence of the initiator and polymers produced by means of the process.

2. BACKGROUND OF THE INVENTION

Cationic polymerization is an ionic polymerization which proceeds via a stepwise reaction of monomer molecules at positively charged active sites. A number of monomers can be polymerized by this method. Examples of such monomers are olefins, vinyl ethers, vinylarenes such as styrene, but in particular compounds comprising heteroatoms such as ethers, thioethers, oxiranes, oxazolines, esters and acetals. Known initiators for cationic polymerization are protic acids such as perchloric acid or trifluoro-methanesulfonic acid or Lewis acids such as boron trifluoride or aluminum trichloride.

Cationic polymerization has achieved particular importance in relation to the production of polyacetals, which are prepared by polymerization of aldehydes via the opening of the carbonyl double bond or by ring opening of cyclic acetals such as trioxane, on a large industrial scale mostly by bulk polymerization.

However, the known initiators for cationic polymerization generally have certain disadvantages. Boron trifluoride is typically stored as a gas under high pressure and is very difficult to handle. Similarly, the quality of polyacetals produced therewith, in particular their long term stability, still leaves room for improvement.

DE 2141600 describes a process for homo- and copolymerization of trioxane in the presence of trifluoromethanesulfonic acid and its homologs with 1-18 carbon atoms as initiator.

EP 0 678 535 describes the production of polyoxymethylene copolymers by means of cationic polymerization using trifluoromethanesulfonic acid and its homologous acids and anhydrides as initiators. The initiator is used in a concentration range of $5*10^{-6}$ to $2*10^{-5}$ mol %, based on the main monomer. The initiators of the cited prior art are extremely active, but have for that very reason the disadvantage that even small dosage fluctuations can lead to pressure fluctuations in the polymerization reactor. In addition, these active initiators react very sensitively to even small amounts of impurities in the monomer, which has a direct effect on process stability. Consequently, these initiators are currently not being used industrially despite their high activity: they do not meet the requirements of commercial manufacture in terms of reliability and production consistency.

SUMMARY OF THE INVENTION

It is an object of the present invention to provide a novel initiator for cationic polymerization that not only is very active and leads to high-quality polymers, but also meets the high requirements of commercial manufacture with regard to reliability and production consistency. In addition, the initiator shall be specifically adjustable within wide limits with regard to its reactivity, and thus be conformable to the particular requirements of a manufacturing operation.

This object is achieved according to the present invention by an initiator for cationic polymerization that comprises a salt of a protic acid as well as a protic acid.

BRIEF DESCRIPTION OF THE FIGURES

FIG. 1 illustrates the temperature course of the reaction mixtures versus time measured with a thermocouple and recorded.

DETAILED DESCRIPTION OF THE INVENTION

A protic acid for the purposes of the present invention is a compound which acts as a proton donor to a monomer. Protic acids particularly useful according to the invention as an initiator are inorganic acids such as sulfuric acid, tetrafluoroboric acid or perchloric acid, but also organic acids such as fluorinated or chlorinated alkyl or aryl sulfonic acids. Further examples comprise homologs of trifluoromethanesulfonic acid such as pentafluoroethanesulfonic acid, heptafluoropropanesulfonic acid, nona-fluorobutanesulfonic acid, perfluoropentanesulfonic acid, perfluorohexane-sulfonic acid and perfluoroheptanesulfonic acid.

The cations of the salts of the present invention can be not only inorganic but also organic in nature. The alkali metal or alkaline earth metal cations are particularly useful as inorganic cations. Lithium salts are particularly preferred because of their good solubility in many monomers. Examples of protic acid salts with inorganic cations are lithium trifluorosulfonate and sodium trifluorosulfonate.

Useful organic cations are particularly ammonium ions, for example triethylammonium or quaternary ammonium ions such as tetramethyl-ammonium, triethylmethylammonium or tetraethylammonium. For example, tetraethylammonium perchlorate can be used as protic acid salt. Preference is given to cations engendering good solubility of the salt in the protic acid and in the monomer.

Particular preference is given to substituted ammonium ions having the general formula (I)

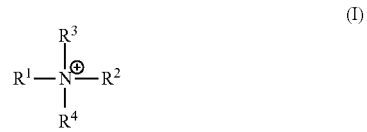

where $R^1$-$R^4$ are independently hydrogen, an alkyl group such as methyl, ethyl, n-propyl, isopropyl, n-butyl, isobutyl or an aryl group such as phenyl or 4-methoxyphenyl.

Substituted ammonium ions are also preferred because the corresponding salts are very simple to prepare by mixing the protic acid with the corresponding amine. Thus, triethylamine and trifluoromethanesulfonic acid combine to form triethylammonium triflate.

Useful organic cations further include protonated nitrogenous compounds, examples being protonated imidazole and protonated amides. Useful amides include for example dimethylformamide, dimethylacetamide and N-methylpyrrolidone.

The anions of the salts are chosen for low nucleophilicity and good thermal stability. Examples are perchlorate, tetrafluoroborate, tetraphenylborate, hexafluorophosphate and the preferred trifluoromethanesulfonate.

According to the present invention, the molar ratio of protic acid to salt can be varied within a wide window. Precisely this must be considered the particular and surprising advantage of the novel initiator. In principle, molar ratios of protic acid to salt in the range from 1:0.01 to 1:2000 are possible, preferably in the range from 1:0.5 to 1:10, more preferably in the range from 1:0.8 to 1:8 and most preferably in the range from 1:1 to 1:4.

The amount of initiator used according to the present invention is in the range from $10^{-6}$% by weight to 1% by weight, preferably in the range from $10^{-5}$% by weight to $10^{-3}$% by weight and more preferably in the range from $2*10^{-5}$% by weight to $5*10^{-4}$% by weight, based on the total weight of monomers used. The amount of initiator used depends on the chemical composition of the protic acid and the chemical composition of the monomers or monomer mixture. For example, typically less initiator is used for homopolymerizing 1,3,5-trioxane than for copolymerizing trioxane with dioxolane.

The initiator of the present invention is particularly preferable for the homo- or copolymerization of 1,3,5-trioxane (trioxane). But in principle tetroxane can also be used as monomer. Useful comonomers include the monomers known to be copolymerizable with trioxane, their fraction in the monomer mixture ranging from 0.1% to 25% by weight and preferably from 0.5% to 10% by weight, all based on the weight of the total mixture.

Known suitable comonomers include cyclic ethers and particularly cyclic acetals having at least 2 adjacent carbon atoms and 3 to 9 ring members. Examples thereof are ethylene oxide, propylene oxide, trimethylene oxide, tetrahydrofuran, butadiene oxide, 1,3-dioxolane, 1,4-butanediol formal, diethylene glycol formal, o-xylene glycol formal, thiodiglycol formal or 1,3-oxthiolane or mixtures thereof. Further copolymerizable comonomers are olefinically unsaturated compounds such as styrene, isobutylene, or linear polyacetals such as polydioxolane.

The molar mass of the homo- or copolymers prepared using the initiator of the present invention is adjusted to the desired values by means of customary regulators, if appropriate. Acetals or formals of the monohydric alcohols are normally used as regulators. Methylal is particularly preferred.

The initiator of the present invention may be used undiluted or in diluted form. When used in diluted form, the initiator is dissolved in a solvent. The concentration of initiator in the solvent is in the range from $10^{-4}$% by weight to 10% by weight, preferably in the range from $10^{-3}$% by weight to 0.2% by weigh and more preferably in the range from $10^{-2}$% by weight to 0.1% by weight. Useful solvents for the initiator include inert organic solvents such as aliphatic or cycloaliphatic ethers having 4 to 10 carbon atoms, halogenated hydrocarbons, glycol ethers, methyl formate or the like. Methylal and 1,3-dioxolane are particularly preferred for use as solvent.

Typically, the initiator is prepared by dissolving protic acid and salt in the solvent and using this solution for starting the polymerization.

However, it is also possible to prepare the salt included in the initiator in situ. For example, the mixture of the monomers may include a base and this mixture is admixed with protic acid in a molar excess, based on the base. The protic acid then reacts with the base to form a salt such that excess protic acid is present as well as salt.

The molar ratio of protic acid to salt can be computed as follows:

Let $n_{base}$ be the number of moles of base added to the monomer mixture and let $n_{acid}$ be the number of moles of protic acid added to the base-containing monomer mixture to initiate the polymerization, then the molar ratio (Vps) of protic acid to salt in the polymerization mixture is:

$$Vps = (n_{acid} - n_{base})/n_{base}$$

(the formula is only valid when $n_{acid} > n_{base}$, i.e., when the protic acid is present in a molar excess relative to the base when acid and base have the same basicity)

This in situ preparation of the initiator may be used to particular advantage in the continuous production of polymers. The initiator solution is in this case prepared by feeding the protic acid and the base or solutions thereof continuously to a mixing appliance, the protic acid being fed in a stoichiometric excess. By varying the feed rates of acid and base or solutions thereof, not only the acid concentration but also the ratio of acid to salt can be set to any desired value and so be conformed to the requirements. In this case, the molar ratio of protic acid to salt $(Vps)_{cont}$ can be computed by the following formula:

$$(Vps)_{cont} = (F_s * C_s / MG_s - F_B * C_B / MG_B) * MG_B (F_B * C_B)$$

where
$F_s$: flow rate of protic acid solution in kg/h
$C_s$: concentration of protic acid in protic acid solution in % by weight
$MG_s$: molar mass of protic acid in g/mol
$F_B$: flow rate of base solution in kg/h
$C_B$: concentration of base in base solution in % by weight
$MG_B$: molar mass of base in g/mol
(this formula also presupposes that acid and base have the same basicity)

A further advantage of the initiator of the present invention is that its activity is less influenced by impurities in the monomer mixture compared with initiator composed of pure protic acid (without added salt).

It is particularly surprising that the reactivity of the initiator of the present invention for cationic polymerization is accurately settable over a very wide range via the ratio of protic acid to salt. This makes it possible to conform the time-course of the polymerization exactly to a given polymerization reactor via the chemical composition of the initiator.

This invention also concerns a process for cationic polymerization or copolymerization of monomers in the presence of an initiator comprising a salt of a protic acid as well as a protic acid. The polymerization is preferably conducted at a temperature in the range from 60 to 180° C. and under a pressure in the range from 1 to 100 bar and preferably in the range from 2 to 60 bar.

The above-described process is preferably utilized for copolymerizing trioxane with comonomers, the comonomers being present in the starting mixture in an amount in the range from 0.1% to 25% by weight and preferably in the range from 0.5 to 10% by weight, based on the total weight of the starting mixture.

This invention further concerns the use of the above-described initiator comprising a salt of a protic acid as well as a protic acid for cationic polymerization or copolymerization of monomers.

This invention will now be more particularly described by operative examples without being restricted to the specifically described embodiments of the initiators and of the cationic polymerization.

Example 1

Preparation of Initiator Solutions 1 to 4:

Various amounts of triethylammonium triflate ("triflate") as reported in table 1 are dissolved in a solution of trifluoromethanesulfonic acid ("triflic") in methylal with stirring.

TABLE 1

| | Initiator solution No. | | | |
|---|---|---|---|---|
| | 1 | 2 | 3 | 4 |
| Triflic (mg) | 80 | 80 | 80 | 80 |
| Triflate (mg) | 0 | 135 | 270 | 540 |
| Methylal (kg) | 1 | 1 | 1 | 1 |

Examples 2-5

In four different experiments, 100 g of trioxane at a time are in each case admixed with 100 microliters of the initiator solutions (1-4) prepared in example 1 with stirring and thereby cationically polymerized. The temperature course of the reaction mixtures versus time is measured with a thermocouple and recorded. The measured curves are shown in FIG. 1. The initiator solution was added at time t=0 sec.

The induction time and the temperature rise rate dT/dt, which is proportional to the polymerization rate, can be read off from the curve. The results are shown in table 2:

TABLE 2

| Initiator solution No. | Induction time | Temperature rise rate at 90° C. |
|---|---|---|
| 1 | 7 sec | 6.1° C./sec |
| 2 | 14 sec | 4.8° C./sec |
| 3 | 22 sec | 3.2° C./sec |
| 4 | 53 sec | 1.4° C./sec |

It is clear from the operative examples carried out how an increasing retardation of the polymerization takes place with increasing ratio of salt to protic acid at the same protic acid concentration.

The melt indices of the polymers for examples 2-5 were identical within the margin of error, namely 4.5 ml/10 min (DIN ISO 1133; 190° C. at 5 kg imposed weight).

What is claimed is:

1. A composition for cationic polymerization comprising:
an initiator comprising at least one protic acid and at least one salt of a protic acid, wherein said at least one protic acid is sulfuric acid, tetrafluoroboric acid, perchloric acid, fluorinated alkyl sulfonic acid, chlorinated alkyl sulfonic acid or aryl sulfonic acid, and wherein said salt of protic acid is an alkali metal or alkaline earth metal salt of protic acid and/or a substituted ammonium salt of protic acid, the cations of the ammonium salt having the general formula (I)

where $R^1$-$R^4$ are independently hydrogen, an alkyl group or an aryl group; and
at least one monomer comprising trioxane.

2. The composition according to claim 1, wherein the organic sulfonic acid is trifluoromethanesulfonic acid, pentafluoroethanesulfonic acid, heptafluoropropanesulfonic acid, nonafluorobutanesulfonic acid, perfluoropentanesulfonic acid, perfluorohexanesulfonic acid or perfluoroheptanesulfonic acid.

3. The composition according to claim 1, wherein where $R^1$-$R^4$ are independently hydrogen, methyl, ethyl, n-propyl, isopropyl, n-butyl, isobutyl or 4-methoxyphenyl.

4. The composition according to claim 1, wherein the molar ratio of protic acid to salt is in the range from 1:0.01 to 1:2000.

5. The composition according to claim 1, wherein the molar ratio of protic acid to salt is in the range from 1:0.5 to 1:10.

6. The composition according to claim 1, wherein the molar ratio of protic acid to salt is in the range from 1:0.8 to 1:8.

7. The composition according to claim 1, wherein the molar ratio of protic acid to salt is in the range from 1:1 to 1:4.

8. The composition according to claim 1, in an amount of $10^{-6}$% by weight to 1% by weight, based on the total weight of monomers used.

9. The composition according to claim 1, wherein the composition includes a mixture of monomers.

10. The composition according to claim 9, wherein trioxane is present in the monomer mixture in the range of from 0.1% to 25% by weight based on the weight of the total mixture.

11. The composition according to claim 1, wherein the composition produces a polyacetal polymer.

* * * * *